April 21, 1964   R. ROCHE   3,130,129
NUCLEAR REACTORS
Filed Aug. 7, 1961

United States Patent Office 3,130,129
Patented Apr. 21, 1964

3,130,129
NUCLEAR REACTORS
Roland Roche, Clamart, Seine, France, assignor to Commissariat a l'Energie Atomique, Paris, France
Filed Aug. 7, 1961, Ser. No. 129,774
Claims priority, application France Sept. 6, 1960
6 Claims. (Cl. 176—42)

The invention relates to nuclear reactors, and concerns more particularly improvements in containers surrounding the core or active part of such reactors, and containing a liquid moderator, such as heavy water for example.

It will be appreciated that containers of this kind consequently have to be of large dimensions, and to exhibit considerable mechanical resistance. It is therefore advisable to make them of materials having excellent mechanical properties, such as special steels, even though the latter exhibit relatively large absorption cross-sections when they are subjected to the intense radiation escaping from the core of the reactor. Cooling must therefore be provided for the container by circulating the liquid moderator in it through a heat exchanger, for example. However, this solution only allows for partial cooling, since certain portions of the container are not in immediate contact with the liquid moderator. In fact, it is indispensable for reasons of safety to provide for a free surface on the liquid in the upper part of the container, leaving an expansion chamber. This arrangement prevents the container itself from exploding, with resultant serious consequences, should there be an explosion inside the container, for example through fracture of one of the force conduits or tubes which are intended for cooling the nuclear fuel, and contain a gaseous fluid under pressure.

Furthermore, varying the level of the moderator in the container can cause the reactivity of the reactor to vary, so that it is often advantageous to have available a free surface level on the moderator capable of changing within fairly wide limits.

The invention has the object above all of improving the design of reactors moderated in the liquid phase, so as to give the following simultaneously: variable level and large free surface for the moderator, an expansion space of arbitrary capacity, and effective cooling of the container and if required any other portion of the reactor cooled by means of the moderator.

When the moderator level varies, some force tubes are no longer immersed in the moderator liquid, so that there is a risk of their cooling being jeopardised. The invention also has the object of overcoming these disadvantages.

According to the present invention there is provided a container for the liquid moderator of a uclear reactor, characterised in that it comprises, internally and at the top, a bell immersed in the moderator at least as far as the minimum level reached by the latter while the reactor is in operation, gas pressure being set up beneath the bell and above the free surface of the moderator liquid, so that the liquid entirely fills the space between the container and the bell, the pressure being variable in order to adjust the level of the free surface, the shape of the said bell being so determined as to leave between it and the free surface an expansion space for the moderator liquid.

In order that the present invention may be well understood there will now be described embodiments thereof, given by way of example only, reference being had to the accompanying drawings in which.

Figure 1:
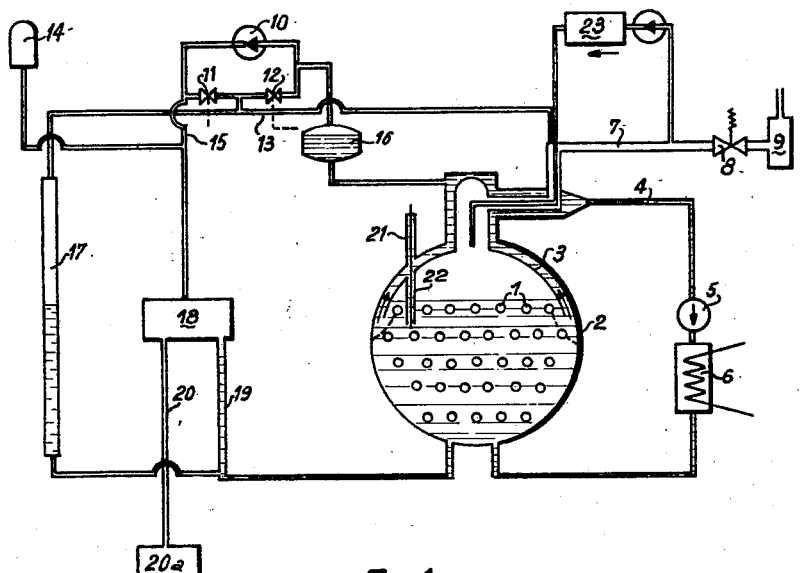
FIGURE 1 illustrates a sectioned diagram of the moderator-liquid circuit of a reactor comprising a container according to the invention.

In FIGURE 1, the force tubes 1 of the reactor are illustrated in section. It is known that these tubes contain the nuclear fuel, and have a fluid under pressure flowing through them. These tubes are assumed to be horizontal; they are immersed in the moderator liquid in the container 2. A bell 3 is disposed at the top of the container 2. This bell is wide open at the base, and its lower part is immersed in the moderator. The free surface of the moderator appears inside the bell, while a slight excess pressure of gas maintained beneath the bell enables continuity to be preserved in the stream of liquid between the bell and the upper part of the container.

The shapes of the upper part of the container and the bell are so chosen as to give a large free surface on the moderator and to make the expansion chamber of suitable volume.

It will be seen that this arrangement enables the moderator liquid to wet the entire internal surface of the container in which it is disposed, whatever the level of the moderator. It will be understood that the container can be well cooled under these conditions.

The drawing illustrates a few members related to a moderator container according to the invention. The moderator-circulation pipe 4 is connected directly to the top of the container 2. The pump 5 maintains this circulation. A heat-exchanger 6 provides for the elimination of excess heat which would tend to raise the temperature of the moderator. After pasing through the exchanger, the cooled liquid is introduced at the bottom of the container 2.

The pressure of the gas above the moderator inside the bell may be adjusted by means of a pressure-regulating system connected to the discharge pipe 7. This pipe, whereof the cross-section is calcuated to prevent the occurrence of any dangerous excess pressure in the container should there be a local explosion inside it, terminates in a calibrated valve 8. Should there be any accidental excess pressure, the valve 8 enables discharge to occur into a chimney 9, after the moderator has passed over solid substances, not illustrated, for recovering moderator liquid when the latter is a valuable liquid such as heavy water.

The pressure-regulating system comprises a fan 10 and two valves 11 and 12 arranged in series in a gas-circulation loop. The pipe 13 opening out between the valves 11 and 12 is in communication with the inside of the bell 3, while the gas-holder 14 containing a reserve of gas for the space above the moderator opens out via the pipe 15 upstream of the valve 11. Between the valve 12 and the fan 10, a pipe provides communication, via an expansion and charging receiver 16, between the closed-circuit gas-loop on the one hand and the moderator liquid in the container on the other hand. When the reactor is operating normally, the free level of the moderator liquid in the receiver 16 is above the free level in the container. This difference in level corresponds to the drop in pressure in the valve 12 resulting from losses of charge suffered by the gas as it moves in the closed-circuit loop comprising the fan 10. If opening of this valve is controlled by a servomotor, the corresponding loss of charge is controlled, and as a result the excess pressure beneath the bell which determines the moderator level in the container. A drop in the moderator level in the container corresponds to closure of the valve 12. A transparent tube 17, connected in gas-tight fashion to the inside of the bell on the one hand and the bottom of the container on the other hand, enables the moderator level inside the reactor to be followed visually.

A safety circuit is provided for draining the pressure-regulating system in case the fan 10 should break down. In this case, there is no longer any difference in pressure between upstream and downstream of the valve 12, so that the moderator would tend to spread throughout the whole of the bell. This would result in an increase in reactivity, and might cause the reactor to run away, although this is highly improbable. To guard against this possibility, there is a safety drainage circuit, comprising a tank 18 communicating on the one hand with upstream of the valve 11 via the pipe 15, and on the other hand with the bottom of the container 2 via the pipe 19, and finally with a drainage tank 20a via a pipe 20. In normal operation, the moderator finds its level in the pipe 19 beneath the tank 18, in particular because of loss of charge in the valve 11. Should the fan stop, the level in the tube 19 rises. The moderator liquid which has entered the tank 18 is discharged via the pipe 20, and this discharge stops as soon as the level in the container 2 is equal to or lower than the level of the bottom of the tank 18.

In order to allow the control rods to pass, tubes such as 21 and 22 are fitted facing one another, the upper tubes being fastened to the top of the container, and the lower tubes being fastened to the inside of the bell. All suitable arrangements are made so that the fluid-tight tubes 21 shall be filled with moderator in motion.

In the case in which the moderator is heavy water or a liquid capable of being regenerated, the catalytic regeneration device 23 comprising a circulating pump, not referenced, will advantageously be arranged with its inlet connected to the discharge pipe 7, and its outlet connected to the top of the bell.

In order to vary the reactivity within wide limits, it may be necessary to vary the moderator level, so that some of the force tubes are exposed, and their cooling by means of the moderator jeopardised.

Figure 2:
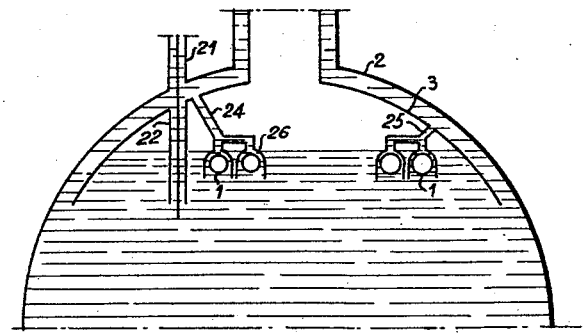
FIGURE 2 illustrates a variant in the embodiment of a container according to the invention.

FIGURE 2 illustrates a variant of embodiment of the container, enabling a solution to be found to this problem of external cooling of those force tubes which may be above the free level of the moderator.

This figure illustrates a portion of the upper part of the container 2 and the corresponding portion of the bell 3. The tubes 21 and 22 intended to enable a control rod to pass will also be seen. Pipes such as 24 and 25, connected to cylindrical bells surrounding the force tubes 1, will also be noted. To take one of these bells as an example, the bell 26: the force tube 1 can be kept in contact with the moderator liquid even when the free level of the latter in the container is below the tube 1. The pipe 24 is clearly not indispensable, but it enables the presence of gas-bubbles in the bell 26 to be prevented. In addition, this pipe facilitates filling the bell 26 the first time the moderator level rises in the container.

Numerous additional arrangements may be made, in particular in order to improve the distribution of moderator liquid in motion in containers comprising a submerged bell, and it is quite clear that these arrangements also form part of the invention.

The example of embodiment chosen to describe the invention is a reactor comprising horizontal force tubes; in fact the invention is equally applicable to vertical-axis reactors, and for each force tube to pass there must then be an arrangement similar to that described for the control rods in the example chosen.

What I claim is:

1. In a liquid moderated nuclear reactor, a container in the reactor, a liquid moderator in said container, force tubes in said container and in said liquid moderator, nuclear fuel in said force tubes, said liquid moderator having a minimum level in said container during operation of the reactor, a bell in and spaced from said container adjacent the top thereof and immersed in said liquid moderator at said minimum level, means for supplying gas under variable pressure in said container above the surface of said liquid moderator and beneath said bell whereby said liquid moderator fills the space between said container and said bell, the pressure of said gas determining the level of said liquid moderator in said container and an expansion chamber for said moderator liquid beneath said bell.

2. A reactor as described in claim 1 including a circuit for circulating said liquid moderator comprising a suction pipe opening into said container adjacent the top of said bell and a return pipe opening into the bottom of said container.

3. A reactor as described in claim 1, said means for supplying gas under variable pressure including an expansion receiver above and connected to said container, a supply of gas under pressure connected to said expansion receiver and valve means between said supply of gas and said expansion receiver for adjusting the gas pressure in said expansion receiver and the gas pressure beneath said bell.

4. A reactor as described in claim 1 including a discharge chimney, a pipe connecting said chimney and said container adjacent the upper end thereof and a calibrated pressure responsive valve in said pipe whereby excessive pressure in said container will open said valve for passage of said liquid moderator to said chimney.

5. A reactor as described in claim 1 including individual bells spaced from and surrounding upper force tubes in said container and pipes opening into said individual bells and into the space between said bell and said container.

6. A reactor as described in claim 1 including fluid-tight tubes passing through said container and through said bell and control rods in said fluid-tight tubes.

References Cited in the file of this patent
UNITED STATES PATENTS

| | | |
|---|---|---|
| 2,743,225 | Ohlinger et al. | Apr. 24, 1956 |
| 2,840,522 | Young et al. | June 25, 1958 |
| 3,034,975 | Beurtheret | May 15, 1962 |